UNITED STATES PATENT OFFICE

GUSTAV HILDEBRANDT, OF MANNHEIM, AND ERWIN LEUBE AND WILHELM BIEHLER, OF LUDWIGSHAFEN-ON-THE-RHINE, GERMANY, ASSIGNORS TO KNOLL A.-G., CHEMISCHE FABRIKEN, OF LUDWIGSHAFEN-ON-THE-RHINE, GERMANY, A FIRM

ETHYLIC-ISOPROPYL ALPHA BROMO ACETAMID AND PROCESS OF PREPARING THE SAME

No Drawing. Application filed May 21, 1928, Serial No. 279,612, and in Germany July 27, 1926.

Our invention relates to a new organic bromine preparation or compound and a method of manufacturing the same, and more particularly to ethylic-isopropyl-alpha bromo acetamid for use as a sedative and hypnotic.

In the German patent specification 158,220 there is described the manufacture of an organic compound of the formula:

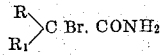

wherein R and $R_1$ designate the ethylic radical and the propylic radical, respectively, which possesses an eminent hypnotic effect.

We have found, after much study and research, that the useful properties of the drug above referred to, that is to say, the hypnotic potency thereof, can be highly increased and improved by substituting the isopropyl group for the propylic residue, and at the same time the toxic character of the drug will be reduced by such substitution.

In accordance with the present invention, therefore, we manufacture the new compound either (1) By brominating the ethylic-isopropyl-acetic acid by means of phosphorus and bromine to produce a brominated acid bromide and substituting $NH_2$ for the final halogen with the aid of ammonia, carbonate of ammonia or other suitable ammonium salts, (2) By treating the acid with a phosphorus haloid, brominating the acid haloid produced by such treatment and proceeding further in the same manner as indicated in (1).

There are several other ways of manufacturing the new compound, such as by:—

(a) Brominating the ethylic-isopropyl-acetamid;

(b) Treating the ethylic-isopropyl-bromo-acetic acid ester with ammonia;

(c) Splitting off water from or dehydrating ethylic-isopropyl-bromo-acetate of ammonium; or (d) Brominating ethylic-isopropyl-acetonitril and subsequently saponifying the bromo-compound to obtain the amid.

We shall now proceed to describe the manufacture of the new compound more in detail by way of specific examples.

*Example 1.*—Dry gas of ammonia is caused to pass through a solution of ethylic-isopropyl-α bromo-acetic acid bromide, at normal or room temperature and at atmospheric pressure, until saturation is attained, the solution consisting of 200 parts by weight of the bromide compound and 1000 parts of a suitable, indifferent solvent such as ether, benzol, ligroin or the like. The ammonium bromide formed in the solution as a by-product is dissolved and separated from the bulk by means of water and any free acid that may have formed in the solution is neutralized and removed by washing the latter out with a solution of bicarbonate of sodium, whereupon the solvent is driven off by evaporation. The resulting substance is thoroughly pure ethylic-isopropyl-α bromo-acetic acid amid of a melting point of 51° C. The output is approximately quantitative.

*Example 2.*—100 parts by weight of ethylic isopropyl-α bromo-acetic acid chloride are mixed with 100 to 150 parts by weight of dry carbonate of ammonia or other suitable ammonium salts. When the reaction is over the mixture under treatment is to be washed successively by means of water and bicarbonate of sodium, just as in Example 1, with the result that the acid amid is obtained, upon removal of the washing liquid, in the form of an oily substance which soon congeals and becomes solid.

The single steps of our manufacturing method are in themselves known, but the product resulting therefrom is novel and endowed with particularly valuable properties which are likewise novel as regards the degree or efficiency thereof, and which as compared with the known bromine compound described in the reference, characterize the new compound as an advance in the art.

In comparing the amid compound described in the reference, herein named A, with the amid compound produced in accordance with the present invention, herein termed B, the following data will show the superiority of the latter.

In accordance with investigations and experiments made with guinea-pigs the lethiferous dose of A is 0.12 gr. per kg., the narcotizing effect brought about by such a dose being very slight only, whereas 0.1 gr. of B per kg. have a very strong narcotic effect, whilst even a dose of 0.3 gr. of B per kg. does not produce any injury to the animal.

The excessive poisonous nature of A, in comparison with B, is still more clearly evident from the following table based upon the four narcotic stages according to Schoen— see Archiv f. experiment.

Pathologie and Pharmakologie, vol. 113, page 277 of 1926—

| Dose in gr. per kg. | Weight of a mouse in gr. | | Attained narcotic stage | | Lethal exit of the experiment. | |
|---|---|---|---|---|---|---|
| | A | B | A | B | A | B |
| 0.10 | 18 | 17 | II | II | — | — |
| 0.15 | 15 | 15 | III | IV | — | — |
| 0.21 | 15 | 15 | IV | IV | — | — |
| 0.32 | 14.5 | 14.5 | IV | IV | + | — |
| 0.46 | 14 | 16 | IV | IV | + | — |
| 0.68 | 14 | 16 | IV | IV | + | + |

What we claim is:—

1. As a new article of manufacture an organic bromine compound of eminent narcotic character and reduced toxic nature termed ethylic isopropyl-alpha bromo-acetamid.

2. The method of producing ethylic isopropyl-alpha bromo-acetamid which comprises treating an ethylic isopropyl-alpha bromo-acetic haloid with ammonia so as to convert the said haloid into the acid amid.

3. The method of producing ethylic isopropyl-bromo acetamid which comprises dissolving an ethylic isopropyl-α bromo-acetic haloid in an organic solvent, saturating the thus obtained solution with dry ammonia gas, washing the same subsequently with water and an alkaline solution, separating the aqueous solution from the liquid residue, and driving off the organic solvent from the latter by evaporation.

In testimony whereof we affix our signatures.

Dr. GUSTAV HILDEBRANDT.
Dr. ERWIN LEUBE.
Dr. WILHELM BIEHLER.